United States Patent
Isik

(10) Patent No.: US 8,943,824 B2
(45) Date of Patent: Feb. 3, 2015

(54) WATER TURBINE HAVING BLADES CONTAINING INFLATABLE ELEMENTS

(76) Inventor: Hasan Hüseyin Isik, Wil (CH)

( * ) Notice: Subject to any disclaimer, the term of this patent is extended or adjusted under 35 U.S.C. 154(b) by 233 days.

(21) Appl. No.: 13/131,725

(22) PCT Filed: Nov. 30, 2009

(86) PCT No.: PCT/CH2009/000380
§ 371 (c)(1),
(2), (4) Date: Jun. 10, 2011

(87) PCT Pub. No.: WO2010/063131
PCT Pub. Date: Jun. 10, 2010

(65) Prior Publication Data
US 2011/0225970 A1 Sep. 22, 2011

(30) Foreign Application Priority Data

Dec. 1, 2008 (CH) ........................... 1891/08

(51) Int. Cl.
*F03B 7/00* (2006.01)
*F03G 3/04* (2006.01)
*F03B 17/06* (2006.01)

(52) U.S. Cl.
CPC ........... *F03B 17/065* (2013.01); *F05B 2260/70* (2013.01); *Y02E 10/28* (2013.01)
USPC .............................................. 60/639; 290/54

(58) Field of Classification Search
CPC ... F03B 17/065; F05B 2260/70; Y02E 10/28; B63H 5/02
USPC ................................... 60/398, 639; 290/42, 53
See application file for complete search history.

(56) References Cited

U.S. PATENT DOCUMENTS

| | | | | | |
|---|---|---|---|---|---|
| 3,360,926 | A | * | 1/1968 | Parr | 60/496 |
| 4,207,026 | A | * | 6/1980 | Kushto | 416/84 |
| 4,224,793 | A | * | 9/1980 | Gutsfeld | 60/398 |
| 4,782,663 | A | * | 11/1988 | Bellamy | 60/398 |
| 5,051,059 | A | * | 9/1991 | Rademacher | 416/140 |
| 6,006,518 | A |   | 12/1999 | Geary | |
| 2008/0298962 | A1 | * | 12/2008 | Sliwa | 416/31 |
| 2008/0304968 | A1 | * | 12/2008 | Fite | 416/140 |

FOREIGN PATENT DOCUMENTS

CA 2544170 10/2007

(Continued)

OTHER PUBLICATIONS

Definition from Dictionary.com on the Internet.*

(Continued)

*Primary Examiner* — Ken Bomberg
*Assistant Examiner* — Paul Thiede
(74) *Attorney, Agent, or Firm* — Dority & Manning, P.A.

(57) ABSTRACT

A water turbine for producing energy in flowing water systems, which can be easily adapted to different usage conditions and enables comparatively high efficiency. The turbine has blades that are pivotably disposed between turbine wheels by joints on the outside circumference of the turbine wheels. An inflatable element is disposed on at least one of the blades and extends parallel to the axis of rotation of the wheels.

8 Claims, 2 Drawing Sheets

(56) References Cited

FOREIGN PATENT DOCUMENTS

| | | |
|---|---|---|
| CA | 2631708 | 10/2008 |
| WO | WO 2004107527 | 12/2004 |
| WO | WO 2008115558 | 9/2008 |

OTHER PUBLICATIONS

Definition from Dictionary.com on the Internet. "inflate." Dictionary.com Unabridged. Random House, Inc. Oct. 2, 2013. <Dictionary.com http://dictionary.reference.com/browse/inflate>.*

European Patent Office Search Report, issued Sep. 3, 2008.

* cited by examiner

US 8,943,824 B2

WATER TURBINE HAVING BLADES CONTAINING INFLATABLE ELEMENTS

CROSS-REFERENCE TO RELATED APPLICATIONS

This application claims priority to International Application Serial No. PCT/CH2009/000380 filed Nov. 30, 2009, which claims priority to Swiss Application No. CH 1891/08 filed Dec. 1, 2008

TECHNICAL FIELD

The invention relates to a turbine, in particular a water turbine for producing energy in flowing water systems.

Turbines for producing energy, in particular turbines in hydroelectric plants, are known. Generally, said turbines comprise a rotor arranged perpendicular to the flow direction of the body of water, with rotatable turbine blades located thereon. The angle of attack of the turbine blades is optionally able to be adjusted to a certain extent, and remains unaltered during operation.

Drive wheels for grinding mechanisms, hammer mechanisms and drive wheels for river craft are also known, with in each case fixed blades.

BACKGROUND

Windmills with pivotable or adjustable blade elements are disclosed in U.S. Pat. No. 3,938,907 and U.S. Pat. No. 4,468,169.

OBJECT AND SUMMARY OF THE INVENTION

The object of the invention, therefore, is to provide a turbine, in particular a water turbine, for producing energy in flowing water systems, which can be easily adapted to different usage conditions and enables comparatively high efficiency.

The object is achieved by the features of the claim.

The individual blades of a turbine are arranged in an articulated manner on the outside circumference of a turbine wheel. They pivot radially outwards only by the action of the flowing medium and fold again inwards in the opposing direction (the side remote from the flow direction), forming the outer surface of the turbine wheel. This reduces friction and thus energy losses.

The angle of attack is 0° to approximately 90° relative to the outer surface tangent line. The blades may pivot out in the upper or (and) in the lower part of the turbine, corresponding to the principal flow direction or depth of flow.

Preferred embodiments are disclosed in the dependent claims. Thus, an inflatable element, for example in the form of a tube or individual balls, is arranged on the outer edge in the axial direction of the turbine on at least some blades. At the start of the pivoting-out or during the pivoting-out of the blades, the inflatable element may be filled with air or other gases in order to accelerate the pivoting-out. In the opposing direction, the folding-in of the blades is promoted by expelling the air. In this case, it is also possible to arrange the inflatable element only in the region of the outer edges (in the vicinity of the turbine wheel) and not over the entire length of the blades.

The blades correspond in their external shape to part of the peripheral surface of a cylinder. They may have guide gates on the inside which are arranged to be adjustable or fixed.

Preferably, the turbine has 8-12 blades.

It is also conceivable to arrange a plurality of turbines adjacent to one another and/or superimposed on one another, for example in larger flowing water systems or in the sea.

BRIEF DESCRIPTION OF THE DRAWINGS

The invention is described in more detail hereinafter in an exemplary embodiment with reference to the drawings, in which.

DETAILED DESCRIPTION OF EXEMPLARY EMBODIMENTS

Figure 1:
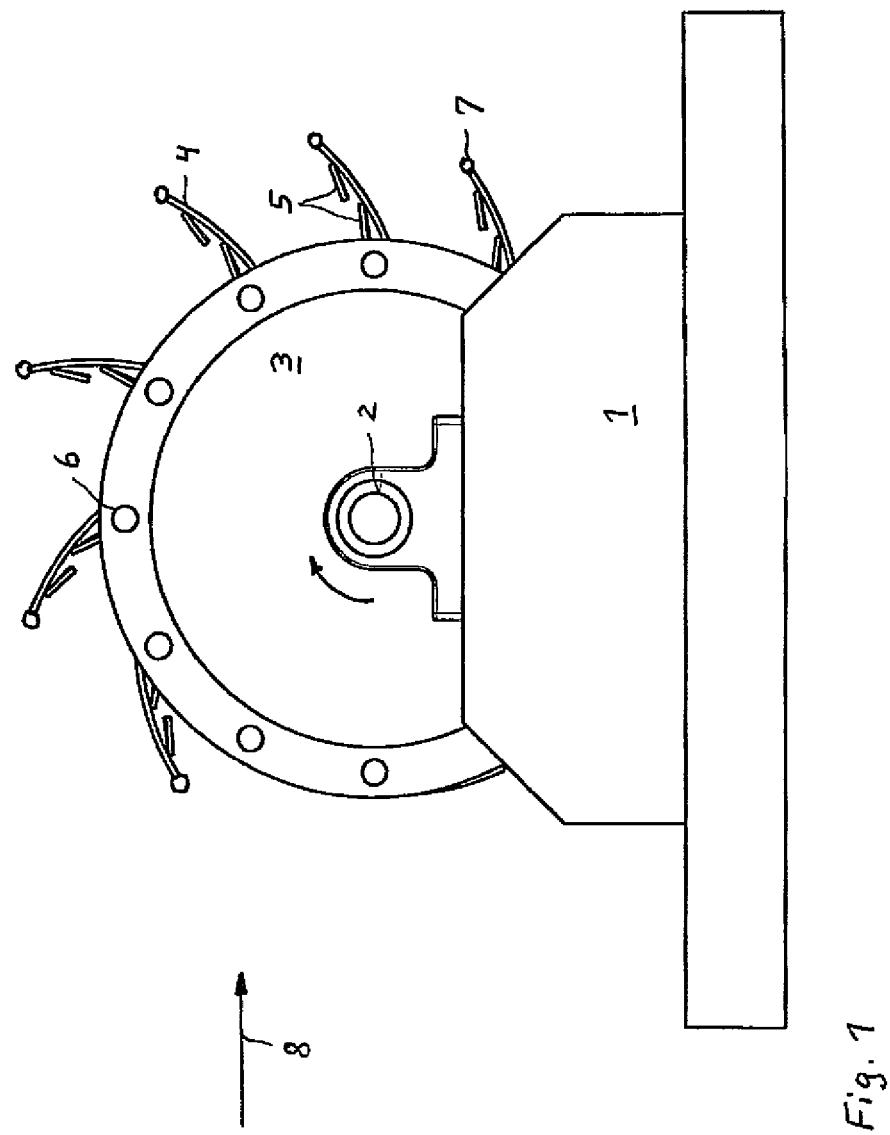
FIG. 1 shows a side view of the turbine.
Figure 2:
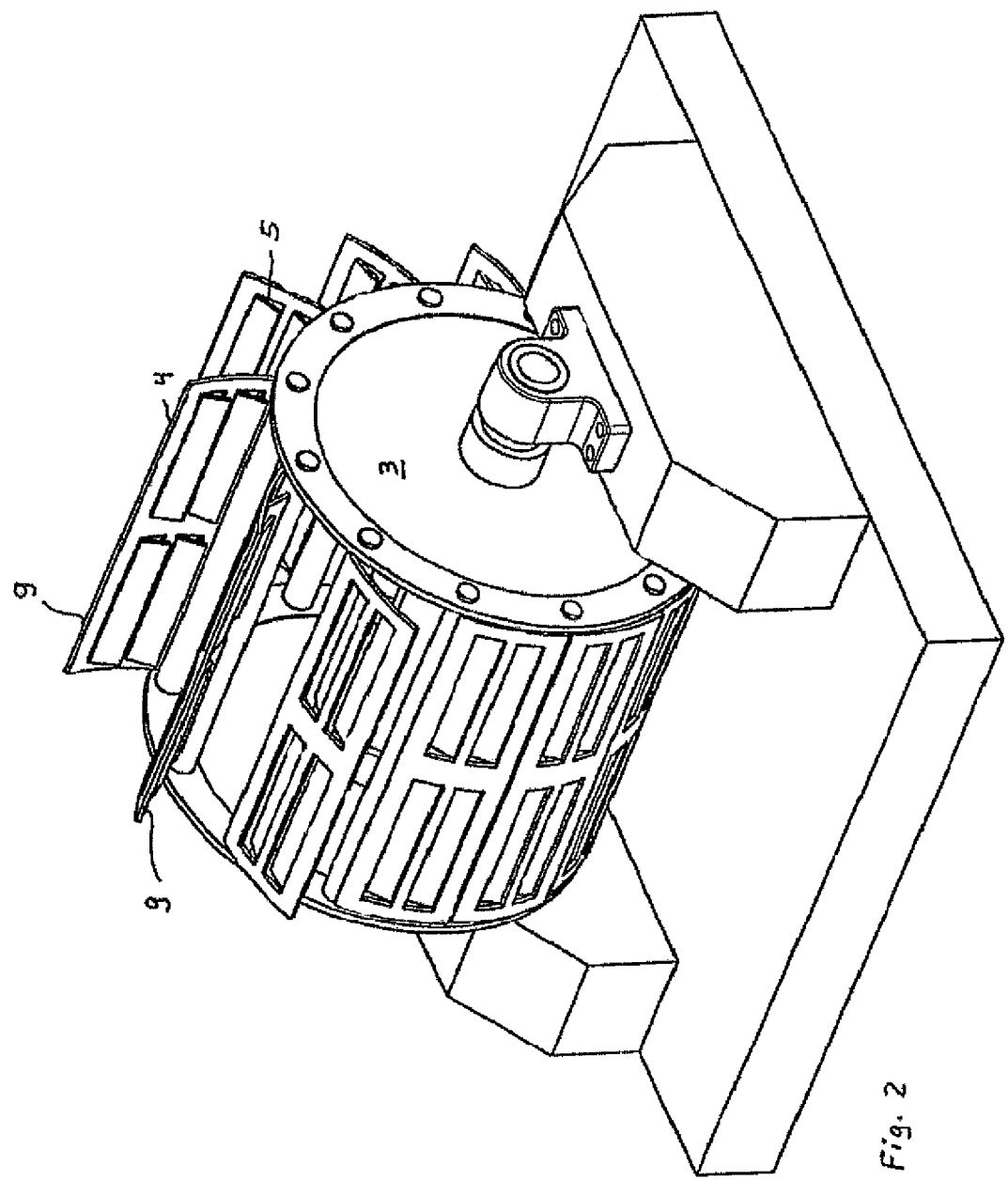
FIG. 2 shows a perspective view of the turbine in a further embodiment.

A turbine is received in a base 1 and is rotatably mounted about its axis 2. The direction of the axis 2 is in this case approximately perpendicular to the flow direction 8 of a flow, the turbine being arranged horizontally and entirely under water. The outer surface of the turbine is formed by 12 blades 4 which are pivotably arranged in joints 6 of the turbine wheels 3. The joints 6 are accordingly attached in the vicinity of the circumference of the turbine wheels 3.

The blades 4 have a curvature corresponding to the radius of the turbine wheel and are provided on their inside with a guide gate 5. On the outer edge 9 of each blade 4, a tube 7 is arranged which extends in the axial direction and is able to be inflated with air. The air is supplied and discharged by means of a supply unit, not shown.

The blades pivot out as soon as their position is approximately parallel to the flow direction 8. The pivoting movement is facilitated, respectively accelerated, by the flow pressure and the incipient filling of air of the tube 7. After a rotation of the turbine by more than 180°, the blades 4 start to fold in again. The air is already expelled beyond a rotation of more than 90°. After approximately 270°, a blade 4 is completely folded in again.

The invention claimed is:

1. A water turbine for producing energy in flowing water systems, comprising:

at least two wheels spaced apart from each other, each wheel including an outside circumference being circular in its basic shape and defined by a radius of curvature, disposed between the wheels is a plurality of blades, each of the blades has a length and a width, the length of each blade is arranged to extend in a direction parallel to an axis of rotation of the wheels, each blade curves along its width according to the curvature of the outside circumference of the wheels, each blade has a concave-shaped inner face disposed toward the origin of the radius of curvature of the blade, each blade has a convex-shaped outer face disposed opposite the inner face, a first opposite end of each of the blades is pivotably connected via a first joint on the outside circumference of a first one of the two wheels, and a second opposite end of each of the blades is pivotably connected via a second joint on the outside circumference of a second one of the two wheels, wherein each blade has an outer free edge that is disposed opposite where each respective blade is pivotably connected to the two wheels; and at least a first one of the blades has a tube that is inflatable with a gas supplied to the tube, said tube being connected to only the outer free edge of the at least first one of the blades, said tube extending parallel to the axis of rotation of the two wheels, the volume occupied by said inflatable tube being selectively increased by filling with the gas and the volume occupied by said tube being selectively decreased by expelling the gas from said tube.

2. The water turbine according to claim 1, comprising 8 to 12 blades.

3. The water turbine according to claim 2, comprising a guide gate arranged on the inner face of at least one of the plurality of blades.

4. The water turbine according to claim 3, wherein the guide gate is adjustable.

5. A water turbine for producing energy in flowing water systems, comprising:
   at least two wheels spaced apart from each other, each wheel including an outside circumference being circular in its basic shape and defined by a radius of curvature,
   disposed between the wheels is a plurality of blades, each of the blades has a length and a width, the length of each blade is arranged to extend in a direction parallel to an axis of rotation of the wheels, each blade curves along its width according to the curvature of the outside circumference of the wheels, each blade has a concave-shaped inner face disposed toward the origin of the radius of curvature of the blade, each blade has a convex-shaped outer face disposed opposite the inner face,
   a first opposite end of each of the blades is pivotably connected via a first joint on the outside circumference of a first one of the two wheels, and a second opposite end of each of the blades is pivotably connected via a second joint on the outside circumference of a second one of the two wheels;
   a guide gate arranged on the inner face of at least one of the plurality of blades and disposed projecting away from the inner face of the at least one blade; and
   at least a first one of the blades has a tube that is inflatable with a gas supplied to the tube, said tube extending parallel to the axis of rotation of the two wheels, the volume occupied by said inflatable tube being selectively increased by filling with the gas.

6. The water turbine according to claim 5, comprising 8 to 12 blades.

7. The water turbine according to claim 5, wherein the guide gate is adjustable.

8. The water turbine according to claim 5, wherein the inflatable tube is only arranged in a region of the outer free edge of the first one of the blades and spaced apart from where the first one of the blades is pivotably connected via the first and second joints.

* * * * *